(12) United States Patent
Corbett (10) Patent No.: US 10,087,972 B2
(45) Date of Patent: Oct. 2, 2018

(54) FASTENER AND FASTENER INSTALLATION TOOL

(71) Applicant: Arconic Inc., Pittsburgh, PA (US)

(72) Inventor: Robert J. Corbett, Woodway, TX (US)

(73) Assignee: Arconic Inc., Pittsburgh, PA (US)

(*) Notice: Subject to any disclaimer, the term of this patent is extended or adjusted under 35 U.S.C. 154(b) by 245 days.

(21) Appl. No.: 15/282,425

(22) Filed: Sep. 30, 2016

(65) Prior Publication Data

US 2017/0016471 A1 Jan. 19, 2017

Related U.S. Application Data

(63) Continuation-in-part of application No. 14/601,453, filed on Jan. 21, 2015, now Pat. No. 9,488,213.

(60) Provisional application No. 61/933,537, filed on Jan. 30, 2014.

(51) Int. Cl.
| | | |
|---|---|---|
| *F16B 35/04* | (2006.01) | |
| *B21J 15/02* | (2006.01) | |
| *B21J 15/04* | (2006.01) | |
| *F16B 19/10* | (2006.01) | |
| *F16B 19/05* | (2006.01) | |

(52) U.S. Cl.
CPC ............. *F16B 35/04* (2013.01); *B21J 15/022* (2013.01); *B21J 15/043* (2013.01); *F16B 19/1063* (2013.01); *F16B 19/05* (2013.01)

(58) Field of Classification Search
CPC ...... F16B 19/05; F16B 19/1063; F16B 35/04; B21J 15/022; B21J 15/043
USPC ........................................................ 411/361
See application file for complete search history.

(56) References Cited

U.S. PATENT DOCUMENTS

| | | |
|---|---|---|
| 2,531,048 A | 11/1950 | Huck |
| 2,531,049 A | 11/1950 | Huck |
| 2,764,045 A | 9/1956 | Koenig |
| 3,029,665 A | 4/1962 | Baugh et al. |
| 3,215,024 A | 11/1965 | Brilmyer et al. |
| 3,915,053 A | 10/1975 | Buhl |

(Continued)

FOREIGN PATENT DOCUMENTS

| | | |
|---|---|---|
| CN | 101360920 A | 2/2009 |
| CN | 101912941 A | 12/2010 |

(Continued)

OTHER PUBLICATIONS

International Search Report and Written Opinion dated Nov. 30, 2016, issued by the European Patent Office in International (PCT) Application No. PCT/US2016/054860 (10 pages).

(Continued)

*Primary Examiner* — Roberta S Delisle
(74) *Attorney, Agent, or Firm* — Greenberg Traurig, LLP (57) ABSTRACT

A fastening system including a fastener and a fastener installation tool. The fastener includes a pin member having an elongated shank portion with a threaded portion, a stop shoulder located at an end of the threaded portion, and a pull portion extending from the stop shoulder. The stop shoulder includes an outer rim and an inner annular wall. The inner annular wall and the inner face form an annular recess. The fastener installation tool includes a puller having a front face. The recess of the fastener is adapted to receive the front face of the fastener installation tool when the puller engages the pull portion of the pin member and facilitates alignment of teeth of the installation tool and pull grooves of the pin member.

28 Claims, 11 Drawing Sheets

(56) References Cited

U.S. PATENT DOCUMENTS

| | | |
|---|---|---|
| 4,299,519 A | 11/1981 | Corbett |
| 4,447,077 A | 5/1984 | Palmer |
| 4,472,096 A | 9/1984 | Ruhl et al. |
| 4,531,871 A | 7/1985 | Sigmund |
| 4,597,263 A | 7/1986 | Corbett |
| 4,813,834 A | 3/1989 | Smith |
| 4,867,625 A | 9/1989 | Dixon |
| 4,878,372 A | 11/1989 | Port et al. |
| 4,921,384 A | 5/1990 | Nordyke |
| 4,943,196 A | 7/1990 | Dahl |
| 4,995,777 A | 2/1991 | Warmington |
| 5,049,016 A | 9/1991 | Nordyke |
| 5,090,852 A | 2/1992 | Dixon |
| 5,125,778 A | 6/1992 | Sadri |
| 5,315,755 A | 5/1994 | Fulbright et al. |
| 5,548,889 A | 8/1996 | Smith et al. |
| 5,604,968 A | 2/1997 | Fulbright et al. |
| 6,233,802 B1 | 5/2001 | Fulbright |
| 6,235,582 B1 | 5/2001 | Chen |
| 6,325,582 B1 | 12/2001 | Sadri et al. |
| 6,497,024 B2 | 12/2002 | Fulbright |
| 6,702,684 B2 | 3/2004 | Harbin et al. |
| 7,195,438 B2 | 3/2007 | Harbin et al. |
| 7,293,339 B2 | 11/2007 | Mercer et al. |
| 7,891,924 B2 | 2/2011 | Mercer et al. |
| 8,621,734 B2 | 1/2014 | Mercer et al. |
| 8,727,685 B2 | 5/2014 | Corbett |
| 2008/0247841 A1 | 10/2008 | Mercer et al. |
| 2009/0053006 A1 | 2/2009 | Hufnagl et al. |

FOREIGN PATENT DOCUMENTS

| | | |
|---|---|---|
| CN | 204458745 U | 7/2015 |
| WO | 2015/116444 A1 | 8/2015 |

OTHER PUBLICATIONS

International Search Report and Written Opinion dated Apr. 21, 2015, issued by the European Patent Office in International (PCT) Application No. PCT/US2015/012153 (9 pages).

FIG. 12B

FASTENER AND FASTENER INSTALLATION TOOL

CROSS-REFERENCE TO RELATED APPLICATIONS

This application is a continuation-in-part of U.S. Ser. No. 14/601,453, filed on Jan. 21, 2015 entitled "FASTENER AND FASTENER INSTALLATION TOOL," which relates to and claims the benefit of U.S. Provisional Patent Application No. 61/933,537, filed on Jan. 30, 2014, entitled FASTENER AND FASTENER INSTALLATION TOOL, all of which are incorporated by reference herein in their entireties.

FIELD OF THE INVENTION

The present invention relates to a fastening system and, more particularly, to a fastening system including a swage type, lock bolt fastener and an associated fastener installation tool.

BACKGROUND OF THE INVENTION

Two-piece swage-type fasteners, commonly referred to as lock bolts, are used to secure a plurality of work pieces together. Typically, swage-type fasteners include a pin member having lock grooves and a swage collar adapted to be swaged into the lock grooves of the pin member by a fastener installation tool. The fastener installation tool includes a nose assembly having a puller that engages a pull portion of the pin member during fastener installation.

SUMMARY OF THE INVENTION

In an embodiment, a fastening system comprising a fastener having a pin member including an elongated shank portion having a threaded portion, a stop shoulder located at an end of the threaded portion, and a pull portion extending from the stop shoulder, wherein the stop shoulder includes an outer rim and an inner annular wall which form an annular recess; and a fastener installation tool having a puller with a front face, wherein the annular recess of the fastener is adapted to receive the front face of the fastener installation tool when the puller engages the pull portion of the pin member. In an embodiment, the front face of the puller of the fastener installation tool is angled at an angle measured transverse to a longitudinal axis of the puller. In an embodiment, the receiving recess of the fastener includes a semi-circular-shaped cross section. In an embodiment, the receiving recess of the fastener includes a square-shaped cross section. In an embodiment, the pull portion of the pin member includes at least one pull groove, and the puller of the fastener installation tool includes at least one tooth that is sized and shaped to engage the at least one pull groove of the pull portion of the pin member.

In an embodiment, the pull portion of the pin member includes a plurality of pull grooves, and the puller of the fastener installation tool includes a plurality of teeth that is sized and shaped to engage the plurality of pull grooves of the pull portion of the pin member. In an embodiment, the plurality of pull grooves is annular pull grooves. In an embodiment, the plurality of pull grooves is helical grooves. In an embodiment, the front face of the puller of the fastener installation tool is adapted to engage the outer rim of the stop shoulder when the fastener installation tool engages the fastener, and wherein the outer rim of the stop shoulder facilitates the receipt of the front face of the puller by the annular recess of the pin member and the alignment of the plurality of teeth of the puller with the plurality of pull grooves of the pin member. In an embodiment, the fastening further comprises a collar adapted to be swaged onto the threaded portion of the pin member. In an embodiment, the pull portion of the pin member includes a breakneck groove located intermediate the stop shoulder and the pull portion of the pin member, wherein the pull portion is adapted to break off from the shank of the pin member at the breakneck groove when a sufficient axial force is applied to the pin member.

In an embodiment, a fastener comprises a pin member including an elongated shank portion having a threaded portion, a stop shoulder located at an end of the threaded portion, and a pull portion extending from the stop shoulder, wherein the stop shoulder includes an inner annular wall and an outer rim which form an annular recess, wherein the annular recess is adapted to receive a front face of a puller of a fastener installation tool when the puller engages the pull portion of the pin member. In an embodiment, the annular recess of the fastener includes a semi-circular-shaped cross section. In an embodiment, the annular recess of the fastener includes a square-shaped cross section. In an embodiment, the pull portion of the pin member includes at least one pull groove adapted to engage at least one tooth of the puller. In an embodiment, the pull portion of the pin member includes a plurality of pull grooves adapted to engage a plurality of teeth of the puller. In an embodiment, the plurality of pull grooves are annular pull grooves. In an embodiment, the plurality of pull grooves are helical pull grooves. In an embodiment, the front face of the puller of the fastener installation tool is adapted to engage the outer rim of the stop shoulder when the fastener installation tool engages the fastener, and wherein the outer rim of the stop shoulder facilitates the receipt of the front face of the puller by the annular recess of the pin member and the alignment of the plurality of teeth of the puller with the plurality of pull grooves of the pin member. In an embodiment, the fastener further comprises a collar adapted to be swaged onto the threaded portion of the pin member. In an embodiment, the pull portion of the pin member includes a breakneck groove located intermediate the stop shoulder and the pull portion of the pin member, wherein the pull portion is adapted to break off from the shank of the pin member at the breakneck groove when a sufficient axial force is applied to the pin member.

In an embodiment, a fastening system includes a fastener having a pin member including an elongated shank portion having a threaded portion, a stop shoulder located at an end of the threaded portion, and a pull portion extending from the stop shoulder, wherein the stop shoulder includes an inner wall, and a stop juxtaposed with the inner wall of the stop shoulder; and a fastener installation tool having a puller with a front face, wherein the stop of the fastener is adapted to receive the front face of the fastener installation tool when the puller engages the pull portion of the pin member. In an embodiment, the stop is made from an elastomeric material.

DETAILED DESCRIPTION OF THE DRAWINGS

Figure 1:
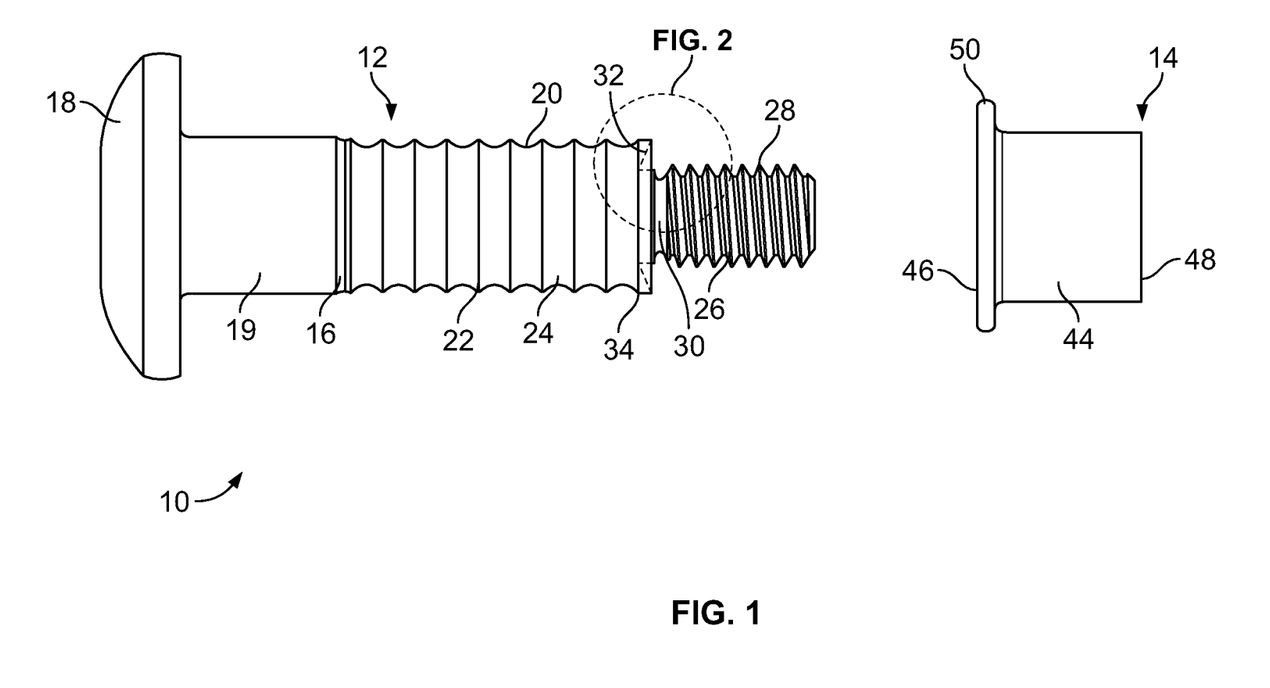
FIG. 1 is a side elevational view of a fastener constructed in accordance with an embodiment of the present invention.

Referring to FIG. 1, in an embodiment, a fastener 10 including a pin member 12 and a swage collar 14 that is sized and shaped to mate with and be swaged onto the pin member 12. In an embodiment, the pin member 12 is a lock bolt. In an embodiment, the pin member 12 includes an elongated shank portion 16 which terminates at one end in a head 18. In an embodiment, the shank portion 16 includes a smooth cylindrical portion 19, a threaded portion 20 having a plurality of threads 22 with lock grooves 24, and a pull portion 26 having a plurality of pull grooves 28. In an embodiment, the pull grooves 28 are helical grooves. In an embodiment, the pull portion 26 includes at least one pull groove 28. In another embodiment, the pull portion includes a single pull groove 28. In an embodiment, the pull portion 26 includes an annular breakneck groove 30 located intermediate the threaded portion 20 and the pull portion 26. In an embodiment, the breakneck groove 30 defines the weakest point of the pin member 12 and is adapted to fracture in response to the axial force applied to the pin member 12, particularly an axial force applied to the pull portion 26.

Figure 2:
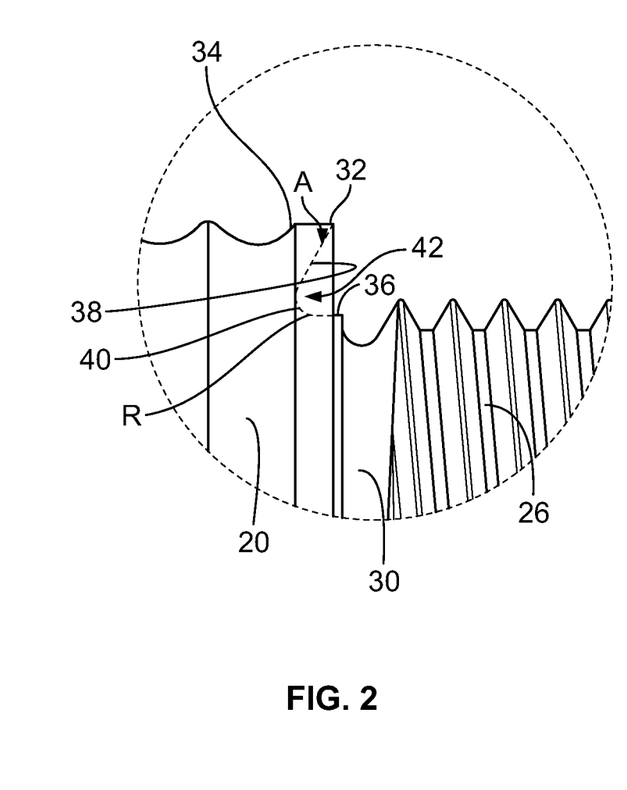
FIG. 2 is an enlarged view of the highlighted circular area shown in FIG. 1.
Figure 3:
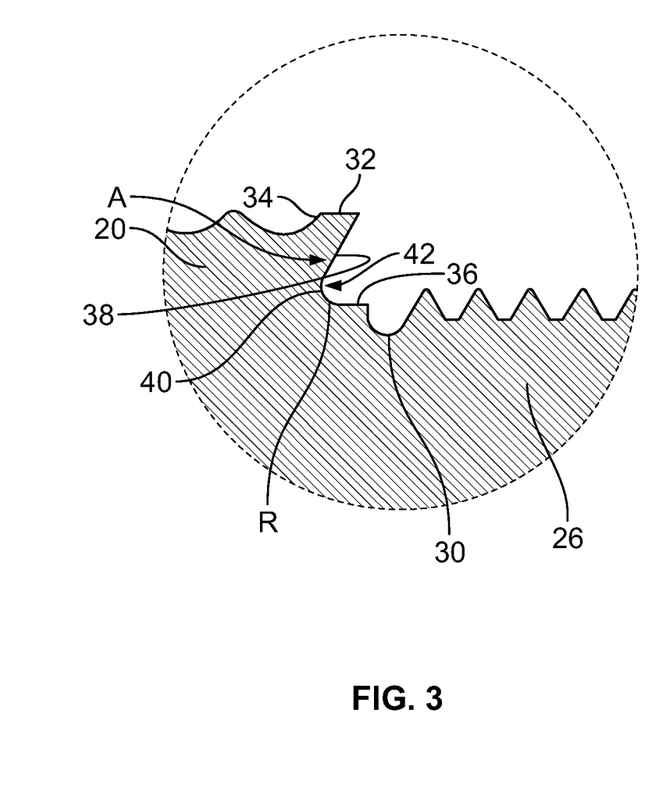
FIG. 3 is a cross-sectional view of FIG. 2.

Referring to FIGS. 1 through 3, in an embodiment, the shank portion 16 of the pin member 12 includes a stop shoulder 32 located at an end 34 of the threaded portion 20 and proximate to the breakneck groove 30 of the pull portion 26. In an embodiment, the stop shoulder 32 is formed annularly on the shank portion 16. In an embodiment, the stop shoulder 32 includes an inner annular wall 36 and an inner face 38 extending outwardly from the shank portion 16. In an embodiment, the annular wall 36 and the inner face 38 are joined by a radiused portion 40 formed intermediate thereof. In an embodiment, the inner wall 36, the inner face 38, and the radiused portion 40 form an annular receiving area 42. In an embodiment, the inner annular wall 36 extends longitudinally from the end 34 of the threaded portion 20. In an embodiment, the inner face 38 of the stop shoulder 32 extends obliquely at an included angle A measured transversely from the longitudinal axis of the pin member 12. In an embodiment, the included angle A is about 120 degrees. In another embodiment, the included angle A is about 110 degrees. In another embodiment, the included angle A is about 100 degrees. In another embodiment, the included angle A is about 130 degrees. In another embodiment, the included angle A is about 140 degrees. In another embodiment, the included angle A is about 150 degrees. In another embodiment, the included angle A is about 160 degrees. In another embodiment, the included angle A is about 170 degrees. In another embodiment, the included angle A is within a range of about 110 degrees to about 170 degrees. In an embodiment, the radiused portion 40 includes a radius of curvature R. In an embodiment, the stop shoulder 32 consists of other shapes and sizes, and can consist of an overhanging lip or curl.

In an embodiment, the pin member 12 is made from medium carbon alloy steel. In an embodiment, the pin member 12 is a Grade 8 strength level bolt. In other embodiments, the pin member 12 can be characterized by any grade known in the art, such as, for example, Grade 2, Grade 5, Grade 8, Class 8.8, and Class 10.9. In other embodiments, the pin member 12 may be made from other suitable materials known in the art.

Referring back to FIG. 1, in an embodiment, the swage collar 14 includes a tubular-shaped shank 44 having a first end 46 and a second end 48 opposite the first end 46, a flange 50 extending circumferentially from and at the first end 46, and a through bore extending from the first end 46 to the second end 48 (not shown in the Figures). In an embodiment, the shank 44 includes a generally uniform, cylindrical configuration. In other embodiments, the swage collar 14 can comprise features of any of the collars as disclosed and described in U.S. Pat. No. 7,293,339 to Mercer et al., which is incorporated by reference herein in its entirety.

In an embodiment, the swage collar 14 includes an internal fit-up tab extending from an inner surface of the collar 14 (not shown in the Figures). In an embodiment, the fit-up tab includes a single thread, such as that shown in U.S. Pat. No. 4,867,625 to Dixon, which is incorporated by reference herein in its entirety. In an embodiment, the fit-up tab is positioned proximate to the second end 48 of the shank 44 of the swage collar 14. In another embodiment, the fit-up tab is positioned proximate to the first end 46 of the shank 44 of the swage collar 14. The purpose and function of the fit-up tab shall be described below. In another embodiment, the swage collar 14 need not include the fit-up tab.

In an embodiment, the swage collar 14 is made of low carbon steel. In another embodiment, the swage collar 14 is made from unannealed low carbon steel. In another embodiment, the swage collar 14 is made from annealed low carbon steel. In another embodiment, the swage collar 14 is "as-headed" and does not require thermal processing, as disclosed and described in aforesaid U.S. Pat. No. 7,293,339 to Mercer et al., which is incorporated by reference herein in its entirety. As employed herein, the term "as-headed" refers to a collar which is strain hardened, for example, from cold working, rather than changing hardness using a thermal process (e.g., quench and tempering; stress relieving; etc.).

Figure 4:
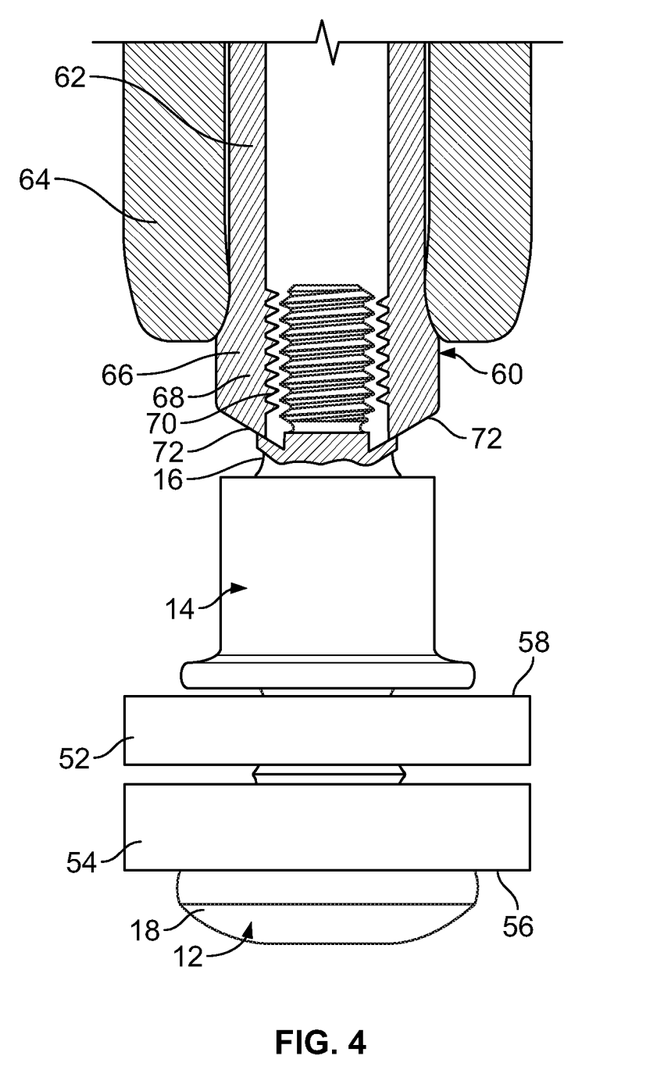
FIGS. 4 through 7 are sequential views of the installation of the fastener illustrated in FIG. 1 by a fastener installation tool.

Referring to FIG. 4, in an embodiment, the fastener 10 is adapted to secure a plurality of work pieces 52, 54 together. In an embodiment, the shank portion 16 of the pin member 12 is inserted through holes of the work pieces 52, 54, with the head 18 abutting one side 56 of the work piece 54 and the shank portion 16 extending outwardly from one side 58 of the work piece 52. In an embodiment, the swage collar 14 is fitted on the shank portion 16 of the pin member 12, whereby the shank portion 16 is inserted within the through bore of the collar 14. In an embodiment, the fit-up tab threadedly engages the threads 22 of the pin member 12 to initially retain the collar 14 on the pin member 12. In an embodiment, the swage collar 14 is fitted on the pin member 12 until the flange 50 of the collar 14 abuts the side 58 of the work piece 52.

Referring to FIG. 4, in an embodiment, a fastener installation tool 60 includes a puller 62 and a swage anvil 64. In an embodiment, the puller 62 includes chuck jaws 66 having internal teeth 68 and pull grooves 70 that are sized, shaped and adapted to grip the pull grooves 28 of the pull portion 26 of the pin member 12. In an embodiment, the pull grooves 70 of the puller 62 are helical grooves. In an embodiment, the puller 62 includes at least one pull groove 70. In another embodiment, the puller 62 includes a single pull groove 70. In an embodiment, the pull grooves 70 of the puller 62 are formed by tapping. In an embodiment, the chuck jaws 66 of the puller include a front face 72. In an embodiment, the front face is angled at an angle B measured transverse to the longitudinal axis of the puller 62. In an embodiment, the angle B is chosen to match or be substantially the same as the angle A of the inner face 38 of the stop shoulder 32 of the pin member 12. In an embodiment, the angle B is about 120 degrees. In another embodiment, the angle B is about 110 degrees. In another embodiment, the angle B is about 100 degrees. In another embodiment, the angle B is about 130 degrees. In another embodiment, the angle B is about 140 degrees. In another embodiment, the angle B is about 150 degrees. In another embodiment, the angle B is about 160 degrees. In another embodiment, the angle B is about 170 degrees. In another embodiment, the angle B is within a range of about 110 degrees to about 170 degrees.

In an embodiment, the fastener installation tool may comprise features of the tools disclosed and described in aforesaid U.S. Pat. No. 7,293,339 to Mercer et al. In an embodiment, the swage anvil of the tool is adapted to engage the swage collar 14 and apply a relative axial force between the swage collar 14 and the pin member 12, and to move over the swage collar 14 and swage it into the lock grooves 24 of the pin member 12.

Figure 5:
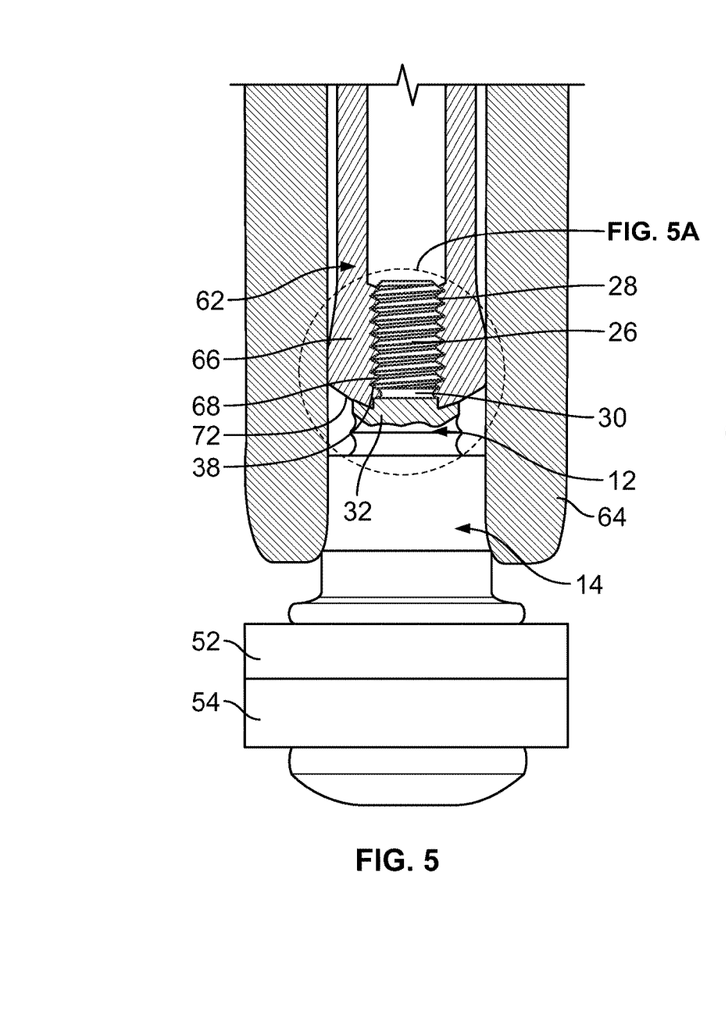
Figure 5A:
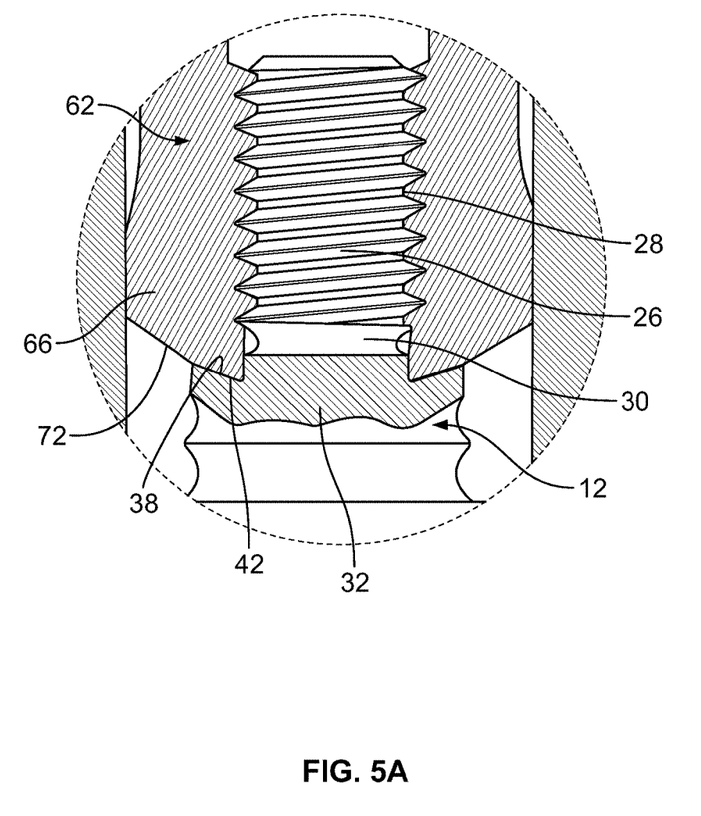

Referring to FIG. 4, in an embodiment, the fastener 10 is attached to the work pieces 52, 54 as described above. In an embodiment, the jaws 66 of the puller 62 are split and spread to an open position in order to clear and slip over the pull portion 26 of the pin member 12. Referring to FIGS. 5 and 5A, in an embodiment, the teeth 68 and pull grooves 70 of the puller 62 engage the pull grooves 28 of the pull portion 26 of the pin member 12. In an embodiment, the face 72 of the jaws 66 of the puller 62 stops against the inner face 38 of the stop shoulder 32 of the pin member 12 to align the puller 62 properly with the pull portion 26 of the pin member 12. Along these lines, the stop shoulder 32 permits the puller 62 to shift forward as it engages the pull portion 26 of the pin member 12 and align the teeth 68 of the puller 62 with the pull grooves 28 of the pull portion 26 of the pin member 12. Depending upon the rotational orientation of the pin member 12 relative to the puller 62, the puller 62 will shift either forward into the receiving area 42 of the stop shoulder 32 of the pin member 12 or backward away from the stop shoulder 32 as the teeth 68 of the puller 62 are closed in on the pull grooves 28 of the pin member 12. If the puller 62 shifts forward, the included angle A of the stop shoulder 32 prevents interference between the puller 62 and the stop shoulder 32. The puller 62 can then slide downward and inward towards the face 38 as the puller 62 is driven forward when engaging the pull portion 26. Once the puller 62 is aligned with the pull portion 26, the jaws of the puller 62 are then move inwardly to a closed position and clamp down on the pull portion 26 and provide an axial force on the pin member 12 and close any gap between the work pieces 52, 54. The anvil 64 then engages and swages the swage collar 14.

Figure 6:
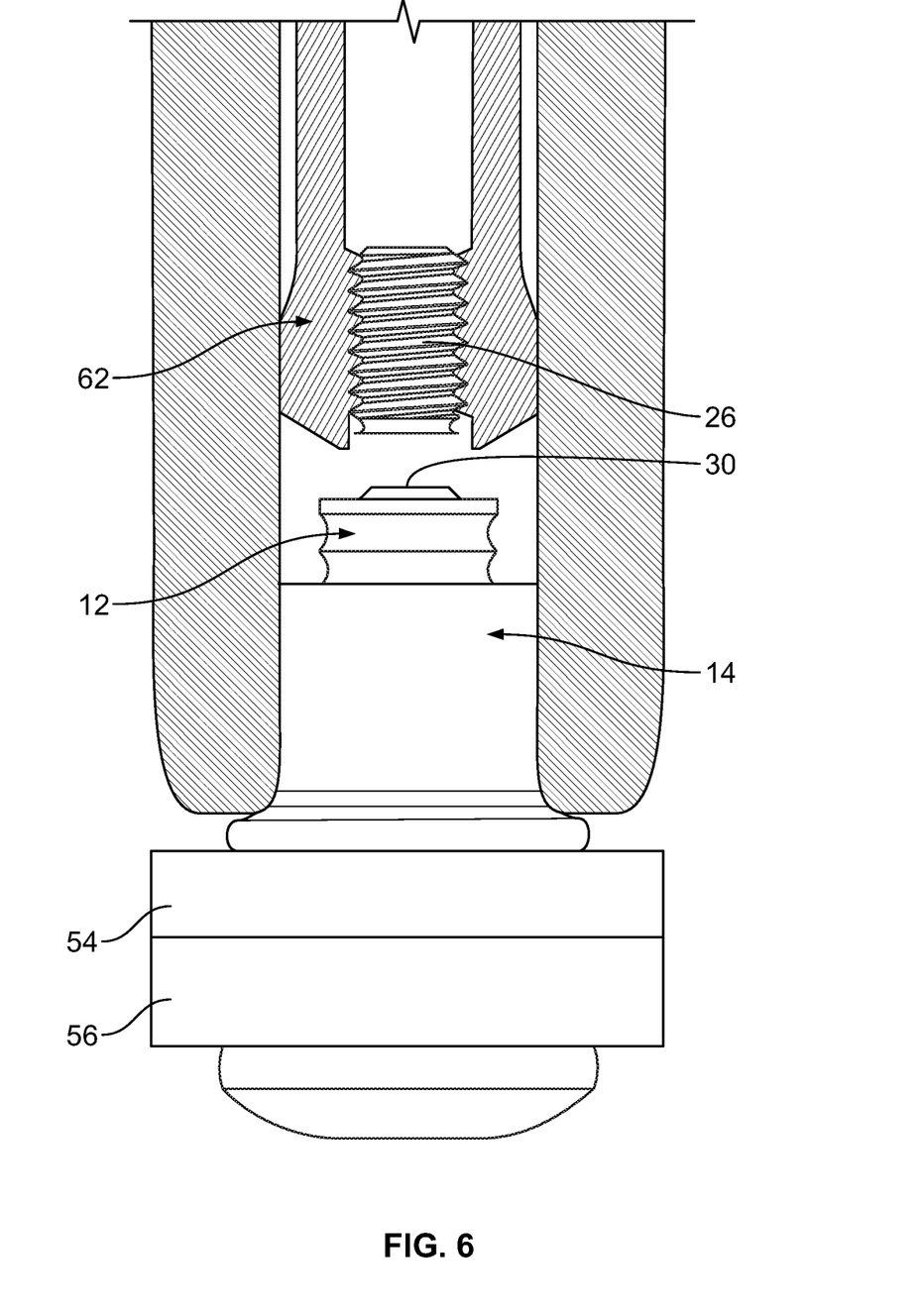
Figure 7:
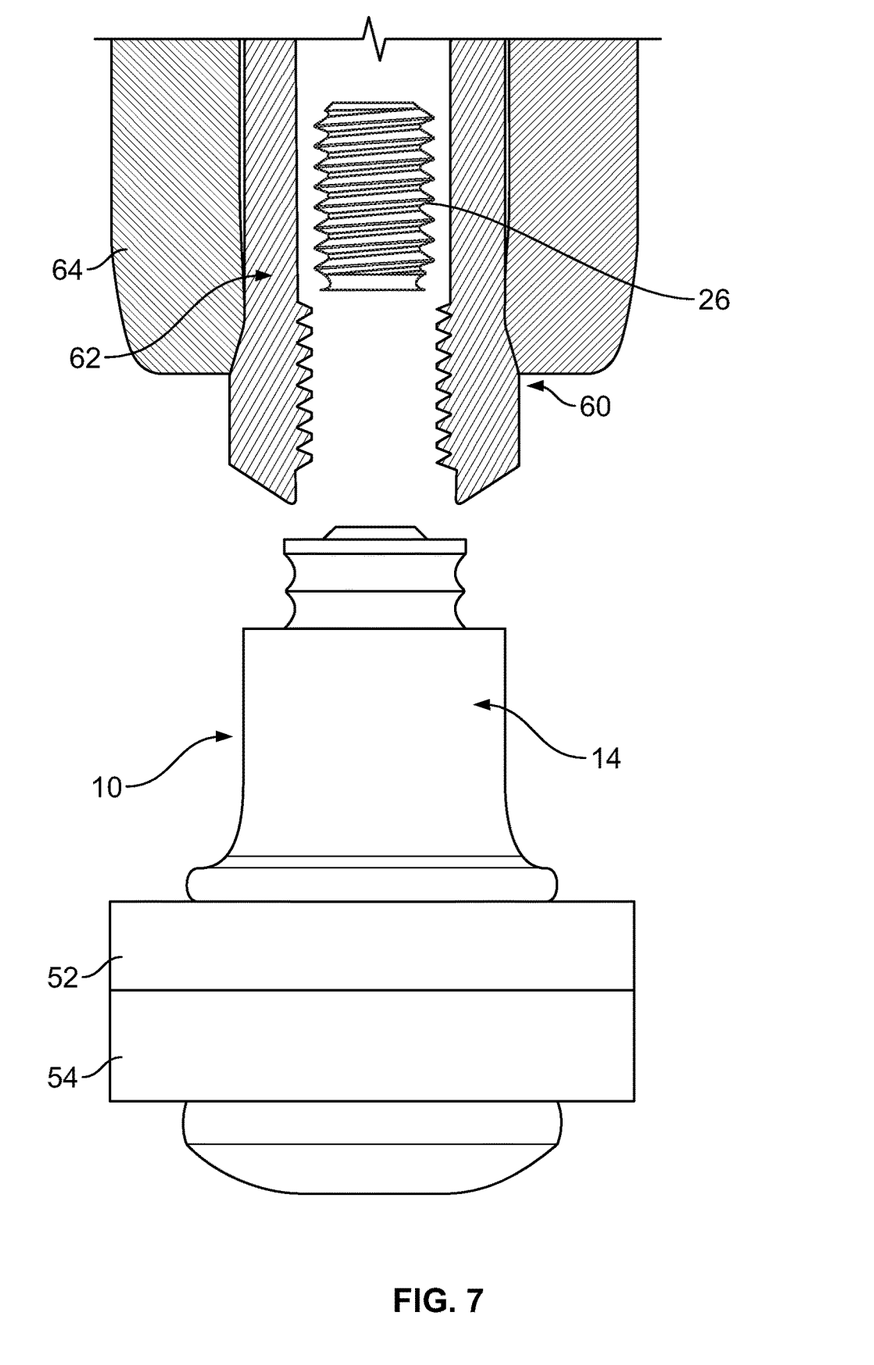

Referring to FIG. 6, when the collar 14 is fully swaged, the puller 62 continues to provide an axial force on the pin member 12 until the pull portion 26 snaps off at the breakneck groove 30, thereby eliminating the excess protrusion. Referring to FIG. 7, the puller 62 returns back and the anvil 64 disengages the swage collar 14. The pull portion 26 ejects from the tool 60 into a collection device. With the pull portion 26 broken off of the installed fastener 10, there exists a visual indication that the tool 60 was applied to the fastener 10.

Figure 8:
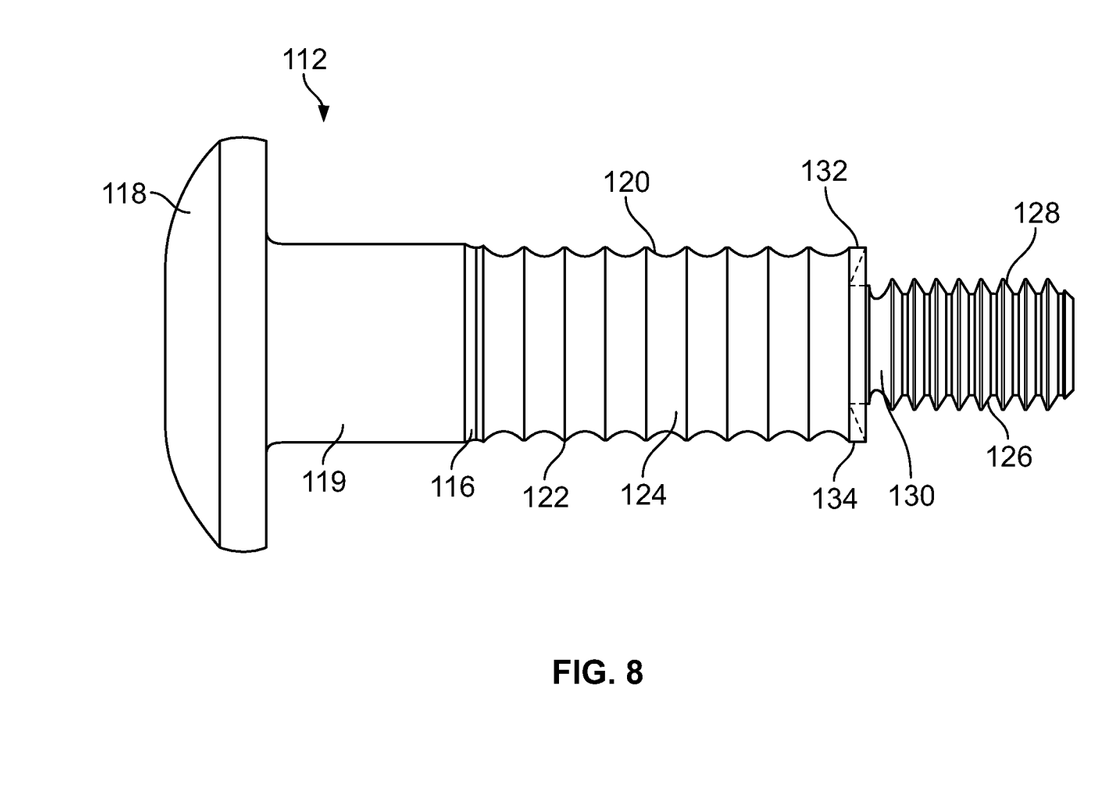
FIG. 8 is a side elevational view of another embodiment of a pin member.

FIG. 8 shows another embodiment of a pin member 112. The pin member 112 includes a structure, features, and characteristics which are similar to those of the pin member 12 except as noted below. In an embodiment, the pin member 112 includes an elongated shank portion 116 which terminates at one end in a head 118. In an embodiment, the shank portion 116 includes a smooth cylindrical portion 119, a threaded portion 120 having a plurality of threads 122 with lock grooves 124, and a pull portion 126 having a plurality of pull grooves 128. In an embodiment, the pull grooves 128 are annular grooves. In an embodiment, the pull portion 126 includes at least one pull groove 128. In another embodiment, the pull portion 126 includes a single pull groove 128. In an embodiment, the pull portion 126 includes an annular breakneck groove 130 located intermediate the threaded portion 120 and the pull portion 126. In an embodiment, the breakneck groove 130 defines the weakest point of the pin member 112 and is adapted to fracture in response to the axial force applied to the pin member 112, particularly an axial force applied to the pull portion 126. In an embodiment, the shank portion 116 of the pin member 112 includes a stop shoulder 132 located at an end 134 of the threaded portion 120 and proximate to the breakneck groove 130 of the pull portion 126. In an embodiment, the stop shoulder 132 includes a structure, features and characteristics which are similar to those as the stop shoulder 32 of the pin member 12 described above and shown in FIGS. 1 through 3.

Figure 9:
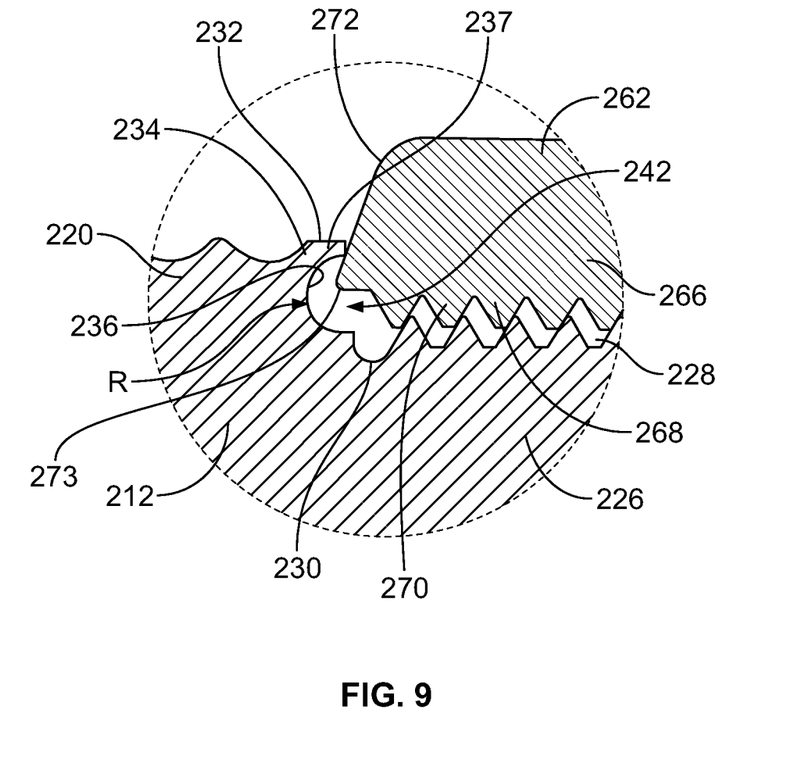
FIG. 9 is a cross-sectional view of a portion of another embodiment of a pin member and a collet of a fastener installation tool engaging the pin member.

FIG. 9 illustrates another embodiment of a pin member 212 having a rimmed stop shoulder 232 located at an end 234 of a threaded portion 220 and proximate to a breakneck groove 230 of a pull portion 226 of the pin member 212. In an embodiment, the stop shoulder 232 is formed annularly on a shank portion of the pin member 212. In an embodiment, the stop shoulder 232 includes an inner wall 236 having a semi-circular cross-section, and an outer annular rim 237. In an embodiment, the inner wall 236 and outer rim 237 form an annular recess 242 having a semi-circular cross-sectional shape. In an embodiment, the inner annular wall 236 extends longitudinally from the end 234 of the threaded portion 220. In an embodiment, the inner annual wall 236 has includes a radius R.

Still referring to FIG. 9, in an embodiment, a puller 262 includes chuck jaws 266 having internal teeth 268 and pull grooves 270 that are sized, shaped and adapted to mate and grip the pull grooves 228 of the pull portion 226 of the pin member 212. In an embodiment, the pull grooves 270 of the puller 262 are annular grooves. In an embodiment, the puller 262 includes at least one pull groove 270. In another embodiment, the puller 262 includes a single pull groove 270. In an embodiment, the chuck jaws 266 of the puller include a front face 272 culminating at a tip 273. In an embodiment, the front face is angled at an angle measured transverse to the longitudinal axis of the puller 262.

In an embodiment, in some instances when the teeth 268 of the puller 262 engages the pull grooves 228 of the pull portion 226 of the pin member 212, the teeth 268 and the pull grooves 228 can be misaligned, as shown in FIG. 9. In an embodiment, the angled front face 272 of the puller 262 engages the rim 237 of the stop shoulder 232 of the pin member 212. In an embodiment, the recess 242 of the stop shoulder 232 is sized and shaped to receive the tip 273 and at least a portion of the front face 272 of the puller 262 to enable the puller 262 to advance in a direction towards the threaded portion 220 and align the teeth 268 of the puller 262 and the pull grooves 228 of the pull portion 226 of the pin member 212.

Figure 10:
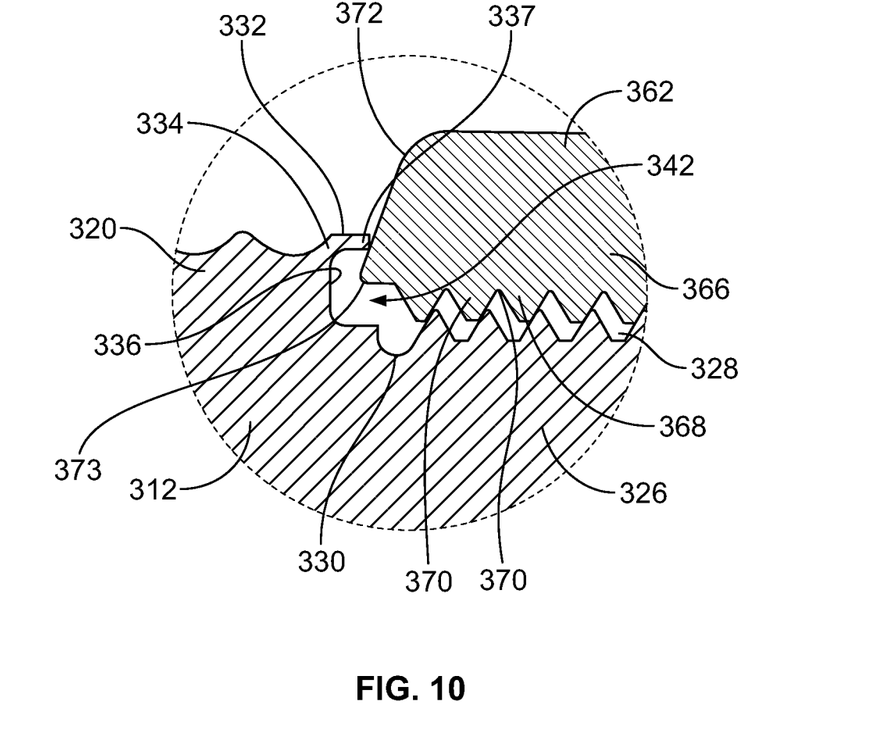
FIG. 10 is a cross-sectional view of a portion of another embodiment of a pin member and a collet of a fastener installation tool engaging the pin member.

FIG. 10 illustrates another embodiment of a pin member 312 having a rimmed stop shoulder 332 located at an end 334 of a threaded portion 320 and proximate to a breakneck groove 330 of a pull portion 326. In an embodiment, the stop shoulder 332 is formed annularly on a shank portion of the pin member 312. In an embodiment, the stop shoulder 332 includes an inner wall 336 having a square-shaped cross-section, and an outer annular rim 337. In an embodiment, the inner wall 336 and outer rim 337 form an annular recess 342 having a square-shaped cross-section.

Still referring to FIG. 10, in an embodiment, a puller 362 includes chuck jaws 366 having internal teeth 368 and pull grooves 370 that are sized, shaped and adapted to mate and grip the pull grooves 328 of the pull portion 326 of the pin member 312. In an embodiment, the pull grooves 370 of the puller 362 are annular grooves. In an embodiment, the puller 362 includes at least one pull groove 370. In another embodiment, the puller 362 includes a single pull groove 370. In an embodiment, the chuck jaws 366 of the puller include a front face 372 culminating at a tip 373. In an embodiment, the front face is angled at an angle measured transverse to the longitudinal axis of the puller 362.

When the teeth 368 of the puller 362 engages the pull grooves 328 of the pull portion 326 of the pin member 312, the teeth 368 and the pull grooves 328 are misaligned, as shown in FIG. 10. In an embodiment, the angled front face 372 of the puller 362 engages the rim 337 of the stop shoulder 332 of the pin member 312. In an embodiment, the recess 342 of the stop shoulder 332 is sized and shaped to receive the tip 373 and the front face 372 of the puller 362 to enable the puller 362 to advance in a direction towards the threaded portion 320 and align the teeth 368 of the puller 362 and the pull grooves 328 of the pull portion 326 of the pin member 312.

Figure 11A:
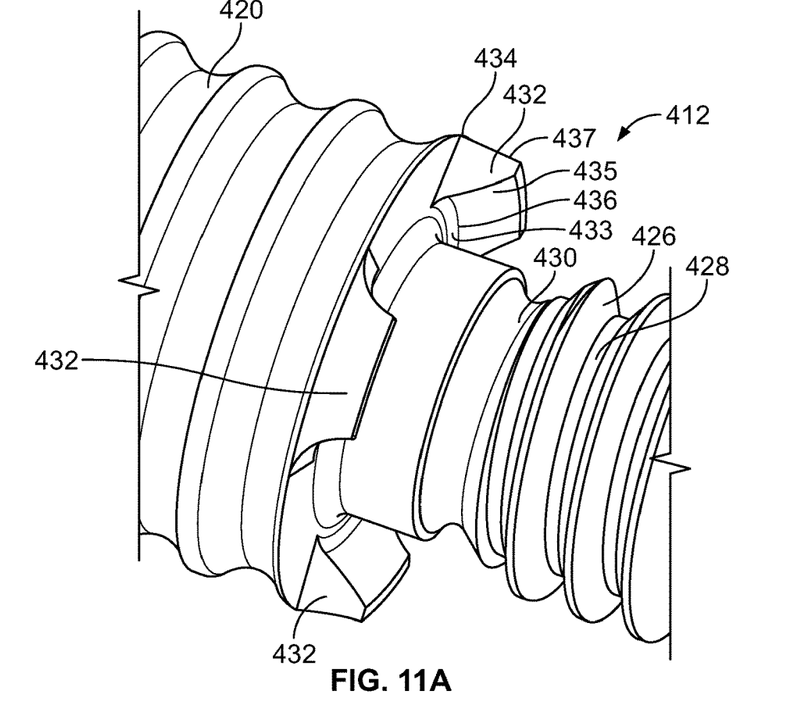
FIG. 11A is a perspective view of a portion of another embodiment of a pin member.
Figure 11B:
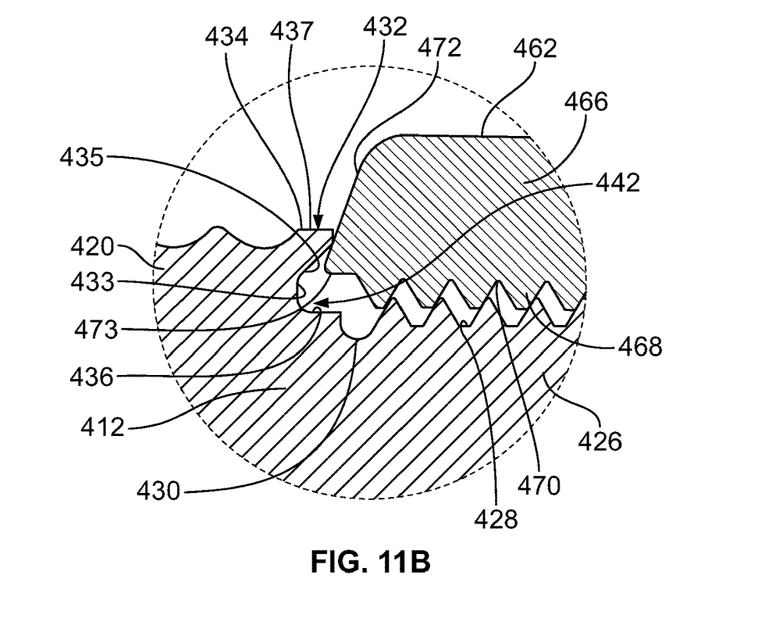
FIG. 11B is a side cross-sectional view of the pin member shown in FIG. 11A and a collet of a fastener installation tool engaging the pin member.

FIGS. 11A and 11B illustrate another embodiment of a pin member 412 having a plurality of rimmed stop shoulders 432 located at an end 434 of a threaded portion 420 and proximate to a breakneck groove 430 of a pull portion 426. In an embodiment, the stop shoulders 432 are spaced apart from one another circumferentially at the end 434 of the threaded portion 420 of the pin member 412. In an embodiment, each of the stop shoulders 432 includes an inner wall 436 having a cross-section with an inner curved portion 433 and an angled (i.e., oblique) portion 435, forming an outer rim 437. In an embodiment, the inner wall 436 and the outer rim 437 form an annular recess 442.

Still referring to FIGS. 11A and 11B, in an embodiment, a puller 462 includes chuck jaws 466 having internal teeth 468 and pull grooves 470 that are sized, shaped and adapted to mate and grip pull grooves 428 of the pull portion 426 of the pin member 412. In an embodiment, the pull grooves 470 of the puller 462 are annular grooves. In an embodiment, the puller 462 includes at least one pull groove 470. In another embodiment, the puller 462 includes a single pull groove 470. In an embodiment, the chuck jaws 466 of the puller include a front face 472 culminating at a tip 473. In an embodiment, the front face 472 is angled at an angle measured transverse to the longitudinal axis of the puller 462.

When the teeth 468 of the puller 462 engages the pull grooves 428 of the pull portion 426 of the pin member 412, the teeth 468 and the pull grooves 428 can be misaligned. In an embodiment, the angled front face 472 of the puller 462 engages the rims 437 of the stop shoulders 432 of the pin member 412. In an embodiment, the recesses 442 of the stop shoulders 432 are each sized and shaped to receive the tip 473 and the front face 472 of the puller 462 to enable the puller 462 to advance in a direction towards the threaded portion 420 and align the teeth 468 of the puller 462 and the pull grooves 428 of the pull portion 426 of the pin member 412.

Figure 12A:
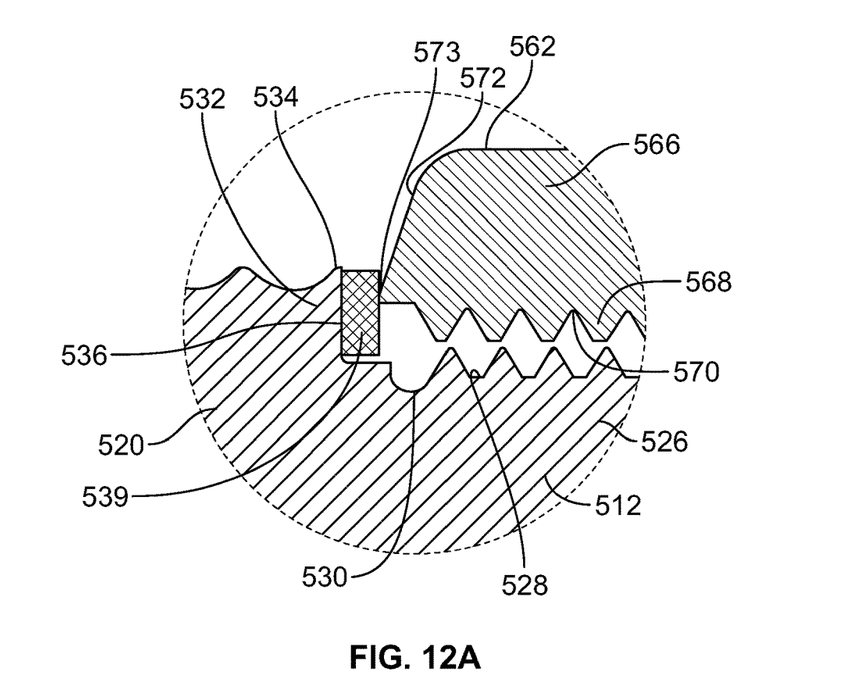
FIGS. 12A and 12B are side cross-sectional views of another embodiment of a pin member and a collet of a fastener installation tool engaging the pin member.
Figure 12B:
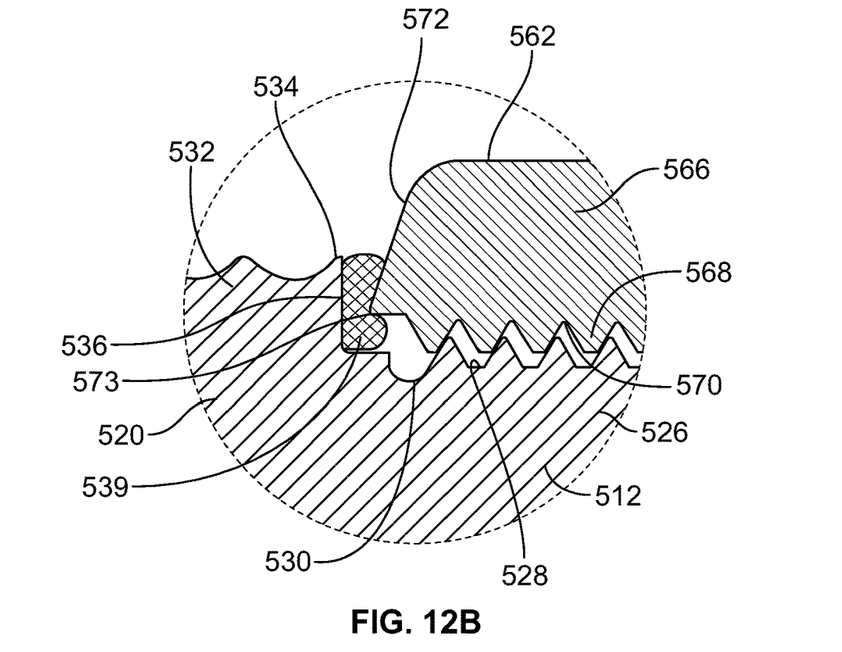

FIGS. 12A and 12B illustrate another embodiment of a pin member 512 having a stop shoulder 532 located at an end 534 of a threaded portion 520 and proximate to a breakneck groove 530 of a pull portion 526. In an embodiment, the stop shoulder 532 is formed annularly on a shank portion of the pin member 512. In another embodiment, the pin member 512 may include a plurality of stop shoulders 532 that are spaced apart from one another circumferentially. In an embodiment, the stop shoulder 532 includes an inner wall 536 that is oriented perpendicular to a longitudinal axis of the pin member 512. In another embodiment, the inner wall 536 is oriented substantially perpendicular to the longitudinal axis of the pin member 512. In an embodiment, a stop 539 juxtaposed with the inner wall 536. In an embodiment, the stop 539 is made from an elastomeric material. In an embodiment, the stop 539 is made from rubber. In another embodiment, the stop 539 is made from polyurethane. In another embodiment, the stop 539 is made from other suitable deformable materials known in the art. In an embodiment, the stop 539 is attached to the inner wall 536 by an adhesive or other means known in the art. In an embodiment, the stop 539 is ring-shaped.

Still referring to FIGS. 12A and 12B, in an embodiment, a puller 562 includes chuck jaws 566 having internal teeth 568 and pull grooves 570 that are sized, shaped and adapted to mate and grip pull grooves 528 of the pull portion 526 of the pin member 512. In an embodiment, the pull grooves 570 of the puller 562 are annular grooves. In an embodiment, the puller 562 includes at least one pull groove 570. In another embodiment, the puller 562 includes a single pull groove 570. In an embodiment, the chuck jaws 566 of the puller include a front face 572 culminating at a tip 573. In an embodiment, the front face 572 is angled at an angle measured transverse to the longitudinal axis of the puller 562.

Referring to FIG. 12A, when the teeth 568 of the puller 562 engage the pull grooves 528 of the pull portion 526 of the pin member 512, the teeth 568 and the pull grooves 528 can be misaligned. In an embodiment, the angled front face 572 and the tip 573 of the puller 562 engage the stop 539 the pin member 512. Referring to FIG. 12B, the puller 562 advances and the front face 572 and the tip 573 of the puller 562 is pushed into the stop 539, which deforms and enables the puller 562 to advance into the stop shoulder 532 as the teeth 568 and the pull grooves 528 engage and align with one another.

It should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:

1. A fastening system, comprising:
a fastener having a pin member including an elongated shank portion having a threaded portion, a stop shoulder located at an end of the threaded portion, and a pull portion extending from the stop shoulder, wherein the stop shoulder includes an outer rim and an inner annular wall which form an annular recess; and
a fastener installation tool having a puller with a front face, wherein the annular recess of the fastener receives the front face of the fastener installation tool when the puller engages the pull portion of the pin member.

2. The fastening system of claim 1, wherein the front face of the puller of the fastener installation tool is angled at an angle measured transverse to a longitudinal axis of the puller.

3. The fastening system of claim 2, wherein the annular recess of the fastener includes a semi-circular-shaped cross section.

4. The fastening system of claim 2, wherein the annular recess of the fastener includes a square-shaped cross section.

5. The fastening system of claim 2, wherein the pull portion of the pin member includes at least one pull groove, and the puller of the fastener installation tool includes at least one tooth that is sized and shaped to engage the at least one pull groove of the pull portion of the pin member.

6. The fastening system of claim 5, wherein the pull portion of the pin member includes a plurality of pull grooves, and the puller of the fastener installation tool includes a plurality of teeth that is sized and shaped to engage the plurality of pull grooves of the pull portion of the pin member.

7. The fastening system of claim 6, wherein the plurality of pull grooves is annular pull grooves.

8. The fastening system of claim 6, wherein the plurality of pull grooves is helical grooves.

9. The fastening system of claim 6, wherein the front face of the puller of the fastener installation tool is adapted to engage the outer rim of the stop shoulder when the fastener installation tool engages the fastener, and wherein the outer rim of the stop shoulder facilitates the receipt of the front face of the puller by the annular recess of the pin member and the alignment of the plurality of teeth of the puller with the plurality of pull grooves of the pin member.

10. The fastening system of claim 1, further comprising a collar adapted to be swaged onto the threaded portion of the pin member.

11. The fastening system of claim 1, wherein the pull portion of the pin member includes a breakneck groove located intermediate the stop shoulder and the pull portion of the pin member, wherein the pull portion is adapted to break off from the shank of the pin member at the breakneck groove when a sufficient axial force is applied to the pin member.

12. A fastener, comprising:
a pin member including an elongated shank portion having a threaded portion, a stop shoulder located at an end of the threaded portion, and a pull portion extending from the stop shoulder, wherein the stop shoulder includes an inner annular wall and an outer rim which form an annular recess, wherein the annular recess receives a front face of a puller of a fastener installation tool when the puller engages the pull portion of the pin member.

13. The fastener of claim 12, wherein the annular recess of the fastener includes a semi-circular-shaped cross section.

14. The fastener of claim 12, wherein the annular recess of the fastener includes a square-shaped cross section.

15. The fastener of claim 12, wherein the pull portion of the pin member includes at least one pull groove adapted to engage at least one tooth of the puller.

16. The fastener of claim 15, wherein the pull portion of the pin member includes a plurality of pull grooves adapted to engage a plurality of teeth of the puller.

17. The fastener of claim 16, wherein the plurality of pull grooves are annular pull grooves.

18. The fastener of claim 16, wherein the plurality of pull grooves are helical pull grooves.

19. The fastener of claim 15, wherein the front face of the puller of the fastener installation tool is adapted to engage the outer rim of the stop shoulder when the fastener installation tool engages the fastener, and wherein the outer rim of the stop shoulder facilitates the receipt of the front face of the puller by the annular recess of the pin member and the alignment of the plurality of teeth of the puller with the plurality of pull grooves of the pin member.

20. The fastener of claim 12, further comprising a collar adapted to be swaged onto the threaded portion of the pin member.

21. The fastener of claim 12, wherein the pull portion of the pin member includes a breakneck groove located intermediate the stop shoulder and the pull portion of the pin member, wherein the pull portion is adapted to break off from the shank of the pin member at the breakneck groove when a sufficient axial force is applied to the pin member.

22. A fastening system, comprising:
a fastener having a pin member including an elongated shank portion having a threaded portion, a stop shoulder located at an end of the threaded portion, and a pull portion extending from the stop shoulder, wherein the stop shoulder includes an inner wall, and a stop made from elastomeric material juxtaposed with the inner wall of the stop shoulder; and
a fastener installation tool having a puller with a front face, wherein the stop of the fastener receives the front face of the fastener installation tool when the puller engages the pull portion of the pin member.

23. The fastening system of claim 22, wherein the pull portion of the pin member includes at least one pull groove adapted to engage at least one tooth of the puller.

24. The fastening system of claim 23, wherein the plurality of pull grooves are annular pull grooves.

25. The fastening system of claim 23, wherein the plurality of pull grooves are helical pull grooves.

26. The fastening system of claim 22, wherein the pull portion of the pin member includes a plurality of pull grooves adapted to engage a plurality of teeth of the puller.

27. The fastening system of claim 22, further comprising a collar adapted to be swaged onto the threaded portion of the pin member.

28. The fastening system of claim 22, wherein the pull portion of the pin member includes a breakneck groove located intermediate the stop shoulder and the pull portion of the pin member, wherein the pull portion is adapted to break off from the shank of the pin member at the breakneck groove when a sufficient axial force is applied to the pin member.

* * * * *